United States Patent
Lavalaye et al.

(10) Patent No.: US 10,131,808 B2
(45) Date of Patent: Nov. 20, 2018

(54) SOLVENTBORNE PIGMENT PASTES COMPRISING METALLIC PIGMENTS AND USE THEREOF FOR PRODUCING SOLVENTBORNE EFFECT COATING MATERIALS

(71) Applicant: BASF Coatings GmbH, Münster (DE)

(72) Inventors: Jorn Lavalaye, Würzburg (DE); Carmen Kunszt, Hammelburg (DE); Norbert Löw, Neustadt/Aisch (DE)

(73) Assignee: BASF Coatings GmbH, Münster (DE)

( * ) Notice: Subject to any disclaimer, the term of this patent is extended or adjusted under 35 U.S.C. 154(b) by 0 days.

(21) Appl. No.: 14/383,952

(22) PCT Filed: Mar. 14, 2013

(86) PCT No.: PCT/EP2013/055269
§ 371 (c)(1),
(2) Date: Sep. 9, 2014

(87) PCT Pub. No.: WO2013/135831
PCT Pub. Date: Sep. 19, 2013

(65) Prior Publication Data
US 2015/0038620 A1  Feb. 5, 2015

Related U.S. Application Data

(60) Provisional application No. 61/610,491, filed on Mar. 14, 2012.

(30) Foreign Application Priority Data

Mar. 14, 2012  (EP) .................... 12159408

(51) Int. Cl.
C09D 101/14 (2006.01)
C09D 17/00 (2006.01)
C09D 5/36 (2006.01)
B05D 5/06 (2006.01)
C09D 7/43 (2018.01)
C09D 7/40 (2018.01)

(52) U.S. Cl.
CPC .......... C09D 17/002 (2013.01); B05D 5/067 (2013.01); C09D 5/36 (2013.01); C09D 7/43 (2018.01); C09D 7/70 (2018.01); C09D 17/006 (2013.01); C09D 17/007 (2013.01)

(58) Field of Classification Search
CPC .. C09D 17/002; C09D 17/006; C09D 17/004; C09D 101/14
See application file for complete search history.

(56) References Cited

U.S. PATENT DOCUMENTS

| | | | |
|---|---|---|---|
| 4,725,317 A * | 2/1988 | Wheeler | B82Y 30/00 106/403 |
| 4,753,829 A * | 6/1988 | Panush | C09D 5/36 427/385.5 |
| 4,971,841 A * | 11/1990 | Panush | B05D 5/068 427/407.1 |
| 5,656,375 A * | 8/1997 | Osterried | A61K 8/027 106/493 |
| 5,773,492 A * | 6/1998 | Ferguson | C09D 5/36 523/171 |
| 6,448,326 B1 | 9/2002 | Mayer et al. | |
| 6,620,868 B1 | 9/2003 | Wilke | |
| 7,691,933 B2 | 4/2010 | Hupp et al. | |
| 8,287,638 B2 | 10/2012 | Schwarte et al. | |
| 2004/0198941 A1 | 10/2004 | Schwarte et al. | |
| 2005/0176880 A1* | 8/2005 | Fujii | C09D 175/12 524/589 |
| 2005/0182179 A1 | 8/2005 | Sapper et al. | |
| 2005/0252416 A1* | 11/2005 | Venturini | B82Y 30/00 106/403 |
| 2006/0178450 A1* | 8/2006 | Ruffieux | C09B 67/0013 523/205 |
| 2007/0051272 A1* | 3/2007 | Wheeler | C09C 1/622 106/31.9 |
| 2007/0199478 A1* | 8/2007 | Schlegl | A61K 8/26 106/404 |
| 2007/0269606 A1 | 11/2007 | Schwarte et al. | |
| 2009/0035475 A1* | 2/2009 | Uemura | B05D 5/06 427/404 |
| 2009/0095202 A1* | 4/2009 | Fechner | C05G 3/00 106/31.86 |
| 2010/0011992 A1* | 1/2010 | Bujard | B82Y 30/00 106/439 |
| 2010/0047462 A1* | 2/2010 | Jansing | B05D 7/53 427/384 |
| 2010/0064938 A1* | 3/2010 | Voit | C09D 5/38 106/287.1 |
| 2011/0048276 A1* | 3/2011 | Schlegl | C09D 11/037 106/31.9 |
| 2011/0088595 A1* | 4/2011 | Wilhelm | C09D 17/004 106/502 |
| 2011/0139034 A1* | 6/2011 | Wczasek | A61K 8/11 106/31.69 |
| 2011/0237683 A1* | 9/2011 | Schmid | C09C 1/0024 514/770 |

(Continued)

FOREIGN PATENT DOCUMENTS

CN  102010648 A  4/2011
CN  103396725 A  11/2013

(Continued)

OTHER PUBLICATIONS

PCT International Search Report in PCT/EP2013/055269, dated May 31, 2013, 3 pages.

(Continued)

Primary Examiner — Liam J Heincer
(74) Attorney, Agent, or Firm — Servilla Whitney LLC

(57) ABSTRACT

Described are solventborne pigment pastes comprising lamellar effect pigments. Also described is the use of the solventborne pigment pastes comprising lamellar effect pigments for producing solventborne effect coating materials. Further described is a process for producing solventborne effect coating materials.

26 Claims, No Drawings

(56) References Cited

U.S. PATENT DOCUMENTS

| | | | |
|---|---|---|---|
| 2012/0034457 A1 | 2/2012 | Low et al. | |
| 2012/0045632 A1* | 2/2012 | Low | B32B 17/10036 428/216 |
| 2012/0282311 A1* | 11/2012 | Schmid | C09C 1/0021 424/401 |
| 2012/0301554 A1* | 11/2012 | Kniess | C09D 17/004 424/635 |
| 2013/0143047 A1* | 6/2013 | Schwarte | C09D 7/004 428/423.1 |

FOREIGN PATENT DOCUMENTS

| | | | |
|---|---|---|---|
| DE | 10-2004-049095 | | 4/2006 |
| EP | 0352298 | | 1/1990 |
| EP | 0578645 | | 1/1994 |
| EP | 0662993 | | 7/1995 |
| EP | 0752455 | | 1/1997 |
| EP | 1504068 | | 2/2005 |
| EP | 1534792 | | 6/2005 |
| EP | 1440101 | B1 | 1/2007 |
| EP | 1799783 | | 6/2007 |
| JP | 2002526616 | A | 8/2002 |
| JP | 2005504157 | A | 2/2005 |
| JP | 2005220287 | A | 8/2005 |
| JP | 2008516031 | A | 5/2008 |
| JP | 2009028607 | A | 2/2009 |
| JP | 2012524161 | A | 10/2012 |
| WO | WO-88/07416 | | 10/1988 |
| WO | WO-92/17554 | | 10/1992 |
| WO | WO-94/07961 | | 4/1994 |
| WO | WO-03/097752 | | 11/2003 |
| WO | WO-2004/024837 | | 3/2004 |
| WO | WO-2006/040284 | | 4/2006 |
| WO | WO-2010/121791 | | 10/2010 |
| WO | 03/029319 | A1 | 3/2013 |

OTHER PUBLICATIONS

BYK-410 Data Sheet, BYK Additives & Instruments, Oct. 20, 2014, 4 pgs.
Duranate MF-K60X Brochure, Asahi Kasei Chemicals, 4 pgs.
Nuplex Brochure, Resins for Automotive OEM Coatings & Plastic Coatings, 6 pgs.
Goldschmidt, Prof. Dr. Artur, et al., "BASF Handbook on Basics of Coating Technology", 2nd Revised Edition, 2007, p. 86.
Brock, et al., "European Coatings Handbook", Werkbibliothek Vincentz, 2012, 5 pgs.

* cited by examiner

SOLVENTBORNE PIGMENT PASTES COMPRISING METALLIC PIGMENTS AND USE THEREOF FOR PRODUCING SOLVENTBORNE EFFECT COATING MATERIALS

CROSS-REFERENCE TO RELATED APPLICATIONS

This application is the National Stage entry of PCT/EP2013/055269, filed on Mar. 14, 2013, which claims priority to U.S. Provisional Application Ser. No. 61/610,491, filed on Mar. 14, 2012, and European Patent Application 12159408.9, filed on Mar. 14, 2012, the disclosures of which are incorporated herein by reference in their entireties.

TECHNICAL FIELD

The present invention relates to solventborne pigment pastes comprising lamellar effect pigments. The present invention further relates to the use of the solventborne pigment pastes comprising lamellar effect pigments for producing solventborne effect coating materials. The present invention additionally relates to a process for producing solventborne effect coating materials.

BACKGROUND

The use of lamellar effect pigments, such as mica pigments or metallic effect pigments, in solventborne basecoat materials per se is long-established practice.

On account of their comparatively high sensitivity to mechanical exposure, however, lamellar effect pigments, more particularly mica pigments and metallic effect pigments, especially aluminum pigments, present problems on incorporation into solventborne coating materials, more particularly solventborne basecoat materials. European patent applications EP 1 504 068 A1, EP 1 534 792 B1 and EP 1 799 783 A1 describe storage-stable, water-based mica, metallic and/or aluminum effect pigment pastes. European patent applications EP 0 578 645 B1, EP 0 662 993 B1 and EP 0 752 455 B1 describe storage-stable, solvent-based mica, metallic and/or aluminum effect pigment pastes.

The mica and metallic effect pigments are typically pasted up or dispersed in organic solvents. A disadvantage is that the pigment pastes in question have only a very limited storage life, amounting to a few hours or days at most. After this time, settling occurs, and bits and coagulum are formed, diminishing the quality of the multicoat color and/or effect paint systems as a result, among other things, of clouding effects. The brevity of storage life is also a major problem for large-scale finishing on the line at the automaker. For instance, the production, for holding in stock, of relatively large quantities of pigment pastes, which would be desirable on economic grounds, is not possible. Problems with transportability, such as the low stability on storage, for example, remove the possibility for the pigment pastes to be produced at a production site with optimum production conditions and transported to the customers. Accordingly, for the tinting of solventborne basecoat materials, the pigment pastes have to be produced anew each time, which complicates and slows down the production process.

Accordingly, a new solventborne pigment paste, comprising lamellar effect pigments, which no longer has the disadvantages of the prior art but instead can be produced simply, stably, storably, transportably and without damage to the lamellar effect pigments is desired. The new solventborne pigment paste comprising lamellar effect pigments is preferably to be storable for up to 3 months without settling and without formation of bits and coagulum, and is to be reagitatable.

SUMMARY

A first aspect of the present invention is directed to a solventborne pigment paste (PP). In a first embodiment, a solventborne pigment paste (PP) comprising effect pigments, comprises, based in each case on the overall composition of the pigment paste (PP), (A) 10% to 30% by weight of at least one lamellar effect pigment (P), (B) 0.1% to 2.0% by weight of a waxlike compound (W), (C) 0.1% to 3.0% by weight of a cellulose acetobutyrate (CAB), (D) 2.0% to 20% by weight of a polyester resin (PE), (E) 2.0% to 10% by weight of a melamine resin, (F) 0.05% to 0.5% by weight of a urea-based thickener, and (G) 30% to 80% by weight or organic solvents.

In a second embodiment, the solventborne pigment paste (PP) comprising effect pigments of the first embodiment is modified, wherein the lamellar effect pigment is a mice pigment and/or metallic effect pigment.

In a third embodiment, the solventborne pigment paste (PP) comprising effect pigments of the first and second embodiments is modified, comprising 15% to 25% by weight of the lamellar effect pigment (P).

In a fourth embodiment, the solventborne pigment paste (PP) comprising effect pigments of the first through third embodiments is modified, comprising 0.5% to 1.5% by weight of the waxlike compound (W).

In a fifth embodiment, the solventborne pigment paste (PP) comprising effect pigments of the first through fourth embodiments is modified, wherein the waxlike compound (W) is a polyolefin wax.

In a sixth embodiment, the solventborne pigment paste (PP) comprising effect pigments of the first through fifth embodiments is modified, comprising 5.0% to 15% by weight of the polyester resin (PE).

In a seventh embodiment, the solventborne pigment paste (PP) comprising effect pigments of the first through sixth embodiments is modified, comprising 5.0% to 15% by weight of the polyester resin (PE).

In an eighth embodiment, the solventborne pigment paste (PP) comprising effect pigments of the first through seventh embodiments is modified, wherein the polyester resin has a weight-average molecular weight of 2000 to 20 000 g/mol, an acid number of 3 to 50 mg KOH/g, and a hydroxyl number of 30 to 500 mg KOH/g.

In a ninth embodiment, the solventborne pigment paste (PP) comprising effect pigments of the first through eighth embodiments is modified, comprising 4% to 7% by weight of the melamine resin.

In a tenth embodiment, the solventborne pigment paste (PP) comprising effect pigments of the first through ninth embodiments is modified, wherein said melamine resin is a high-imino butanol-etherified melamine resin.

In an eleventh embodiment, the solventborne pigment paste (PP) comprising effect pigments of the first through tenth embodiments is modified, comprising 0.1% to 0.3% by weight of a urea-based thickener.

In a twelfth embodiment, the solventborne pigment paste (PP) comprising effect pigments of the first through eleventh embodiments is modified, wherein the urea-based thickener is a polyurethane-modified urea.

In a thirteenth embodiment, the solventborne pigment paste (PP) comprising effect pigments of the first through twelfth embodiments, comprising at least 10% by weight, based on the overall composition of the pigment paste (PP), of butyl acetate in the solvent fraction.

A second aspect of the invention is directed to a used. A fifteenth embodiment is directed to the use of the solventborne pigment paste (PP) comprising effect pigments of the first through thirteenth embodiments.

A third aspect of the invention is directed to a process for producing solventborne coating materials (B). In a sixteenth embodiment, a process for producing solventborne coating materials (B) comprises using the solventborne pigment paste (PP) comprising effect pigments of the first through fourteenth embodiments.

A fourth aspect of the invention is directed to a solventborne coating material (B). In a seventeenth embodiment, a solventborne coating material (B) comprises at least one solventborne pigment paste (PP) comprising lamellar effect pigments according to the first through fourteenth embodiments.

DETAILED DESCRIPTION

It is to be possible to produce the new solventborne pigment paste comprising lamellar effect pigments at a production site that affords optimum conditions and to transport it to the customers, more particularly to the automakers. In this way, the cost and complexity involved in stockholding is to be significantly reduced, and the procedure for producing pigmented coatings simplified. Furthermore, the new solventborne pigment paste comprising lamellar effect pigments is to be amenable to shearing in the circuit lines of the painting units without problems, and without being damaged.

The new solventborne pigment paste comprising lamellar effect pigments is to enable the preparation of storable, transportable, shade-stable, effect-stable and easy-to-apply, solventborne coating materials, more particularly solventborne basecoat materials, which produce outstanding multicoat color and/or effect paint systems of automotive quality (in this regard see also European patent EP 0 352 298 B1, page 15, line 42, to page 17, line 40).

Provided is a solventborne pigment paste (PP) comprising lamellar effect pigments, which, based on its overall composition, comprises
(A) 10% to 30% by weight of at least one lamellar effect pigment (P),
(B) 0.1% to 2.0% by weight of a waxlike compound (W),
(C) 0.1% to 3.0% by weight of cellulose acetobutyrate (CAB),
(D) 2.0% to 20% by weight of a polyester resin (PE),
(E) 2.0% to 10% by weight of a melamine resin,
(F) 0.05% to 0.5% by weight of a urea-based thickener,
(G) 30% to 80% by weight of organic solvents
and is referred to below as "pigment paste (PP) of the invention".

The pigment paste (PP) of the invention may furthermore comprise all of the other constituents and additives that are typically used in pigment pastes and/or coating materials.

Moreover, the pigment pastes (PP) of the invention are used for preparing solventborne effect, more particularly color and effect, coating materials (B). This use of the pigment pastes (PP) of the invention is referred to below as "use in accordance with the invention".

The process for preparing an effect coating material (B) is referred to below as "process of the invention".

In light of the prior art it is surprising and was unforeseeable for the skilled person that the object on which the present invention is based is achieved with the aid of the pigment pastes (PP) of the invention without any occurrence of the disadvantages of the prior art that were outlined at the outset.

The pigment paste (PP) of the invention can be prepared simply and without damage to the lamellar effect pigments (P). Only small amounts of additives are added to the lamellar effect pigments (P), and nevertheless the pigment paste (PP) of the invention is surprisingly stable, transportable and storable. A particular surprise is that the pigment paste (PP) of the invention can be stored for up to 3 months without settling and without bits and coagulum being formed.

The pigment paste (PP) of the invention can be produced at a production site which affords optimum conditions and can be transported to the customers, more particularly to the automakers. In this way the cost and complexity involved in stockholding for the customer can be significantly reduced and the procedure of producing coatings can be simplified. Moreover, the pigment paste (PP) of the invention is amenable to shearing in the circuit lines of the painting units without problems, and without being damaged.

The pigment paste (PP) of the invention is suitable for preparing storable, transportable, shade-stable, effect-stable, easy-to-apply, solventborne coating materials (B), more particularly solventborne basecoat materials (BL).

These solventborne basecoat materials (BL) allow the production of outstanding multicoat effect, or color and effect, paint systems of automotive quality. In accordance with European patent EP 0 352 298 B1, page 15, line 42, to page 17, line 14, this means that the multicoat paint systems in question exhibit
(1) high gloss,
(2) high distinctness of image,
(3) high and uniform hiding power,
(4) uniform dry film thickness,
(5) high gasoline resistance,
(6) high solvent resistance,
(7) high acid resistance,
(8) high hardness,
(9) high abrasion resistance,
(10) high scratch resistance,
(11) high impact strength,
(12) high intercoat adhesion and adhesion to the substrate, and
(13) high weathering stability and UV stability.

Pigment pastes, also pigment concentrates or pigment preparations, are pigmented systems which contain as much pigment and as little binder as possible, with the pigments being present in dispersed form in the pigment pastes. Pigment pastes are used for producing and tinting target systems, such as paints or other coating materials, for which the pigment pastes are added fundamentally to the desired, binder-containing target system in different quantities according to the field of use (production or tinting). The purpose of the pigment pastes is to simplify the incorporation of the pigments into coating materials. Pigment pastes are not used directly for the coating of substrates, but instead serve in principle as additives for the production and tinting of coating systems, such as paints.

The pigment paste (PP) of the invention comprises at least one lamellar effect pigment (P). An effect pigment produces an optical effect which derives primarily from reflection of light. Pigments which produce only one shade are not effect pigments. A skilled person understands the lamellar effect pigments (P) to be the pigments of which he or she is aware, having, in one or more embodiments, a ratio of lamella thickness to lamella diameter of between 1:50 and 1:500. Examples of lamellar effect pigments (P) are metallic effect pigments, pearlescent pigments and mica pigments (cf. Römpp Lexikon Lacke and Druckfarben, Georg Thieme Verlag, Stuttgart, N.Y., 1998, Effektpigmente [Effect pigments], page 176).

In one or more embodiments, there is just one lamellar effect pigment (P) in the pigment paste (PP). When only one lamellar effect pigment (P) is present, the flexibility in the setting of the shades is greater. If necessary, however, a plurality of lamellar effect pigments (P) may be present. Through the combination of effect pigments it is possible to facilitate incorporation, which may represent an advantage for subsequent processing and for user handling.

Mica pigments are customary and known effect pigments, having a laminar structure comprising a layer of mica and at least one metal oxide layer. The mica pigments impart an optical effect and form part of the group known as pearlescent pigments; in addition, they may also impart color (cf. Römpp Lexikon Lacke und Druckfarben, Georg Thieme Verlag, Stuttgart, N.Y., 1998, Perlglanzpigmente, Perlmuttpigmente, [pearlescent pigments, mother-of-pearl pigments] page 438). They are customary and known commercial products and are sold for example by the company Engelhard under the brand name Mearlin® or by the company Merck under the brand name Iriodin®.

The metallic effect pigments are understood here to include finely divided lamellar metallic pigments, such as, for example, aluminum pigments, gold-bronzes, oxidized bronzes or iron oxide-aluminum pigments.

By aluminum pigments (aluminum bronze, silver bronze) are meant lamellar metallic effect pigments which are produced from foundry aluminum of minimum purity 99.5% (DIN EN 573-3; 1994-12) or from pure aluminum of minimum purity 99.95%, by the Hall or Hametag process, respectively. Aluminum pigments are used to impart effect (metallic effect) in, for example, automotive topcoats, hammer finish materials, chrome effect materials and other effect coating materials, and also in printing inks. They are also used, however, as functional pigments in anticorrosion coatings (barrier effect), reflection coatings and other specialty fields. One relatively new development are effect pigments in which the aluminum lamella is coated with a thin layer of iron oxide (iron oxide-aluminum pigments). As a result of interference at this layer, the metallic effect is joined by a color effect (cf. Römpp Lexikon Lacke und Druckfarben, Georg Thieme Verlag, Stuttgart, N.Y., 1998, p. 24 "Aluminium-Pigmente" [aluminum pigments]).

In the pigment paste (PP) of the invention the lamellar effect pigments (P) are present in an amount of 10% to 30% by weight, more particularly of 15% to 25% by weight, based in each case on the overall composition of the pigment paste (PP). In one or more embodiments, lamellar effect pigments (P) used are mica pigments and/or metallic effect pigments, very specifically aluminum pigments.

The pigment paste (PP) of the invention may further comprise at least one pigment different from the lamellar effect pigments (P), and selected, in one or more embodiments, from the group consisting of organic and inorganic, color-imparting, electrically conductive, magnetic, magnetically shielding, corrosion-inhibiting and extender pigments, pigments having at least two of these properties, and nanoparticles, provided such additional pigment does not adversely affect the performance properties of the pigment paste (PP) of the invention. In one or more embodiments, the pigment paste (PP) of the invention does not comprise any further pigment.

The pigment paste (PP) of the invention comprises binders based on polyester, melamine and cellulose acetobutyrate (CAB). Regarding the term "binders", reference is made to Römpp Lexikon Lacke und Druckfarben, Georg Thieme Verlag, Stuttgart, N.Y., 1998, "Bindemittel" [binders], pages 73 and 74, and binders, according to DIN EN ISO 4618:2006, section 2.24, are the nonvolatile fraction of a coating material minus pigments and fillers. Dispersing resins are used for dispersing pigments (Römpp Lexikon Lacke und Druckfarben, Georg Thieme Verlag, Stuttgart, N.Y., 1998, "Anreiben" [dispersing], page 34) for the purpose of producing pigment pastes or pigment preparations (cf. also Römpp Lexikon Lacke und Druckfarben, Georg Thieme Verlag, Stuttgart, N.Y., 1998, "pigmentpräparationen" [Pigment präparations], page 452). Polyester, melamine and CAB are binders which have a particularly high capacity for dispersing pigments.

It is essential to the invention that the pigment paste (PP) of the invention comprises at least one waxlike compound (W).

In connection with the present invention, "wax" and "waxlike compound" refer to all of the natural and synthetically obtained waxes and waxlike compounds that are known to the skilled person. In one or more embodiments, the waxes and waxlike compounds have all of the following properties:

1. Solid to brittly hard and kneadable at 20° C.
2. Coarsely to finely crystalline, translucent to opaque, but not glasslike.
3. Melting without decomposition above 40° C.
4. Of low viscosity even a little above the melting point.
5. Highly temperature-dependent in consistency and solubility.
6. Polishable under gentle pressure.

If a substance fails to fulfill one of these properties, it is not a "wax" or a "waxlike compound" (cf. Ullmanns Enzylopädie der technischen Chemie; 4th, revised and expanded edition; Verlag Chemie; Weinheim; Deerfield Beach, Fla.; Basel, 1983, page 3, and Römpp Chemie Lexikon; 9th, expanded and revised edition; Thieme Verlag; 1995). Accordingly, all "waxes" are also subsumed by the term "waxlike compounds". Waxes differ from similar synthetic or natural products, such as resins, plastic masses or metal soaps, primarily in that they enter the low-viscosity liquidmelt state generally at between 50 and 200° C. and are virtually free from ash-forming compounds. Possible waxlike compounds which also are subsumed within the term of the thickeners according to the invention are not included in the fraction of the waxlike compounds (W), but instead are considered part of the thickeners fraction.

The waxlike compounds (W) may be modified and/or unmodified. Suitable as waxlike compounds (W) are all customary waxes that are known per se, although, in one or more embodiments, synthetic waxes are used.

Examples of natural waxes are plant waxes, such as carnauba wax, candelilla wax, esparto wax, guaruma wax, Japan wax, cork wax, montan wax, ouricury wax, rice germ oil wax, sugarcane wax, and animal waxes, such as beeswax, wool wax, shellac wax and spermaceti, and mineral waxes, such as ceresin and ozokerite.

Examples of chemically modified waxes are hard waxes, such as hydrogenated jojoba waxes, montan ester waxes and Sasol waxes.

Also suitable, for example, are modified and unmodified polyolefin waxes, such as polyethylene and polypropylene waxes, polyethylene glycol waxes and polyamide waxes. Additionally suitable are polyacrylate polymers and polyacrylate copolymers which like wax exhibit a pronounced temperature-dependency in their solubility in organic solvents.

In one or more embodiments, polyethylene and polypropylene waxes are either homopolymers or copolymers with 0.5% to 40% by weight of comonomer units originating from saturated or unsaturated monocarboxylic acids or the amides or esters thereof are used. Examples of comonomer units of these kinds include the radicals of acrylic acid, methacrylic acid, maleic acid, fumaric acid, acrylamide, stearic acid or stearamide, or vinyl acetate. The polyolefin waxes are available commercially under diverse names.

Suitable polyamide waxes include all polyamide waxes typically used in coating compositions. Examples of polyamide waxes used include fatty acid-containing polyamide waxes, such as polyamide waxes based on dimer and/or trimer fatty acids and hexamethylenediamine. Corresponding polyamide waxes are available commercially under the Disparlon name, for example.

Also suitable are waxlike polysiloxanes, such as polydimethylsiloxanes and polydiphenylsiloxanes, for example, or modified silicones, e.g. polyester-, polyether- and acrylate-modified silicones.

In one or more embodiments, the waxlike compound (W) is used in an amount of 0.1% to 2.0% by weight, more specifically of 0.5% to 1.5% by weight, based in each case on the overall composition of the pigment paste (PP). In one or more specific embodiments, polyolefin waxes are used, more specifically polyethylene waxes.

In one or more embodiments, the waxlike compounds (W) have a weight-average molecular weight of between 300 and 20 000 g/mol, specifically between 1000 and 10 000 g/mol, and a drop point of between 70 and 180° C., more specifically between 70 and 130° C. A particularly advantageous feature of the waxlike compounds (W) is that they also contribute to improving the thixotropy, thereby preventing the settling of the lamellar effect pigments (P). Furthermore, the waxlike compounds (W), of one or more embodiments, exhibit an advantageous effect on the orientation of the lamellar effect pigments (P) in the coating following application.

Cellulose acetobutyrate (CAB) is the ester of cellulose with acetic acid and butyric acid. CAB can be prepared by esterifying cellulose with the anhydrides of acetic acid and of butyric acid. In one or more embodiments, CAB contains 0.5 to 2.1 acetyl groups and 2.3 to 0.6 butyryl groups per cellulose unit, corresponding to a bound acetic acid content of 8% to 43% by weight and to a bound butyric acid content of 18% to 59% by weight.

The amount of cellulose acetobutyrate (CAB) used in the pigment paste (PP) of the invention is 0.1% to 3.0% by weight, specifically 0.5% to 2.5% by weight, more specifically 1.0% to 2.0% by weight, based in each case on the overall composition of the pigment paste (PP).

In one or more embodiments, suitable polyester resins (PE) may be saturated or unsaturated, specifically unsaturated. Unsaturated in this context means that the polyester resins are not fully saturated and contain at least one carbon-carbon multiple bond. Polyester resins (PE) are prepared by the esterification of organic dicarboxylic or polycarboxylic acids or their anhydrides with organic diols or polyols, or derive from a hydroxycarboxylic acid or a lactone. Depending on the nature and functionality of the starting materials, the products formed are linear, branched or crosslinked. In order to prepare branched polyester resins (PE), it is possible to use polyols and/or polycarboxylic acids having a functionality of more than 2. Through the use of diols with dicarboxylic acids it is possible to prepare linear polyester resins (PE), and the dicarboxylic acids or diols used may be linear or branched aliphatic, cycloaliphatic or aromatic dicarboxylic acids or diols.

The diols suitable for preparing the polyesters (PE) are, for example, alkylene glycols, such as ethylene glycol, propylene glycol, butylene glycol, 1,4-butanediol, 1,6-hexanediol and neopentyl glycol, and other diols, such as dimethylolcyclohexane. Alcohols with a functionality of more than 2 that can be used include polyols, such as trimethylolpropane, glycerol and pentaerythritol. In one or more embodiments, the acid component of the polyester (PE) is selected from low molecular weight dicarboxylic acids or their anhydrides having 2 to 44, specifically 4 to 36, carbon atoms in the molecule. Examples of suitable acids include o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. In place of these acids it is also possible to use their anhydrides, where they exist. In the formation of polyester resins (PE) it is also possible to use carboxylic acids having 3 or more carboxyl groups, an example being trimellitic anhydride.

It is also possible to use polyester resins (PE) obtained by reacting a lactone with a diol or polyol. These resins are notable for the presence of terminal hydroxyl groups and repeating polyester components of the formula (—CO—$(C_nH_{2n-x}R^1_x)$—O). In one or more embodiments, in this formula, n is 4 to 7, x is 1 to 6, and the substituent $R^1$=hydrogen or an alkyl, cycloalkyl or alkoxy radical, it also being possible for $R^1$ to be different within one group. The substituent $R^1$ contains not more than 12 carbon atoms, and the total number of the carbon atoms in all substituents $R^1$ also does not exceed 12 per lactone ring. Examples thereof are hydroxycaproic acid, hydroxybutyric acid, hydroxydecanoic acid and/or hydroxystearic acid. For the preparation of the polyester resins (PE) which are based on a reaction of lactones, preference is given to the unsubstituted epsilon-caprolactone, in which n has a value of 4 and all of the $R^1$ substituents are hydrogen. The reaction of lactones can be started by means of low molecular weight polyols, such as ethylene glycol, 1,3-propanediol, 1,4-butanediol or dimethylolcyclohexane. It is also possible, however, for other reaction components, such as ethylenediamine, alkyldialkanolamines or else urea, to be reacted with caprolactone. Suitable diols of relatively high molecular weight also include polylactam diols, which are prepared by reacting, for example, episilon-caprolactam with low molecular weight diols.

The amount of polyester resin (PE) used in the pigment paste (PP) of the invention is 2.0% to 20% by weight, specifically 5.0% to 15% by weight, based in each case on the overall composition of the pigment paste (PP).

In one or more embodiments, the polyester resin (PE) has a weight-average molecular weight of 2000 to 20 000 g/mol, more specifically 2000 to 10 000 g/mol. In one or more embodiments, the polyester resins (PE) have an acid number of 3 to 50 mg KOH/g, more specifically of 3 to 30 mg KOH/g, and have a hydroxyl number of 30 to 500 mg KOH/g.

The pigment pastes (PP) comprise at least one melamine resin. Melamine resins are polycondensation resins of melamine (1,3-triazine-2,4,6-triamine) and a maximum of 6 mol of formaldehyde per mole of melamine. The resultant methylol groups may be wholly or partly etherified with one alcohol or different alcohols. Melamine resins may have different degrees of methylolation and different degrees of etherification.

The degree of methylolation of the melamine resin describes how many of the possible methylolation sites on the melamine are methylolated, i.e. how many of the total of six hydrogen atoms of the primary amino groups of the melamine (i.e. of the 1,3,5-triazine-2,4,6-triamine) have been replaced by a methylol group. A fully methylolated monocyclic melamine resin therefore has six methylol groups per triazine ring, such as hexamethylolmelamine, for example. The methylol groups may also be present, independently of one another, in etherified form.

The degree of etherification of a melamine resin means the proportion of methylol groups in the melamine resin that have been etherified with an alcohol. In the case of a fully etherified melamine resin, all of the methylol groups present are not free, but have been etherified with an alcohol. Monohydric or polyhydric alcohols are suitable for the etherification.

Melamine resins may be monomeric (monocyclic) or oligomeric (polycyclic). The "monocyclic" or "polycyclic" identifier relates to the number of triazine rings per molecule of melamine resin. An example of a monocyclic, fully methylolated and fully butanol-etherified melamine resin is hexamethoxybutylmelamine.

Butanol-etherified melamine resins are advantageous, in which butanol is used for the etherification. In this context it is possible to use butanol mixtures or to use the individual butanols in pure form; preference is given to using n-butanol and/or isobutanol, and great preference to using isobutanol (2-methylpropanol).

Preferred melamine resins are high-imino melamine resins, which have incomplete methylolation. In one or more embodiments, the molar formaldehyde incorporation ratio here is less than 1:5.5, which means that one mole of melamine is reacted with less than 5.5 mol of formaldehyde. The high-imino melamine resin therefore contains free NH groups, specifically more than 0.5 NH group per molecule. In addition to the free NH groups, high-imino melamine resins have a high degree of etherification, specifically more than 80%.

In one or more embodiments, the high-imino, butanol-etherified melamine resins have a molar melamine:formaldehyde:butanol incorporation ratio of 1:3 to 5.5:3 to 5.5, with the degree of etherification being specifically greater than 80%, more specifically greater than 90%, very specifically greater than 99%. Particular preference is given to using high-imino, butanol-etherified melamine resins having a molar melamine:formaldehyde:butanol incorporation ratio of 1:3.5 to 4.5:3.5 to 4.5, where the degree of etherification is greater than 80%, more specifically greater than 90%, very specifically greater than 99%.

The melamine resin is present in the pigment paste (PP) at 2.0% to 10% by weight, specifically 4.0% to 7.0% by weight, based in each case on the overall composition of the pigment paste (PP). As melamine resin it is preferred to use a high-imino butanol-etherified melamine resin.

The pigment paste (PP) of the invention comprises 0.05% to 0.5% by weight, more particularly 0.1% to 0.3% by weight, based on the overall composition of the pigment paste (PP), of a urea-based thickener.

The effect of a thickener based on modified urea is that it is insoluble in the customary paint solvents. When incorporated into the paint system, the additive undergoes controlled precipitation, forming very fine, needle-shaped crystals, which then develop a three-dimensional network structure. Initial development of this structure may take several hours. When a paint material of this kind is applied, the network structures are destroyed even by low shearing forces, and the material exhibits a (desired) low application viscosity. The redevelopment of the structure after application is very quick and leads to a rapid increase in viscosity in the applied paint film.

As thickener it is preferred to use a polyurethane-modified urea, more specifically a reaction product of tolylene 2,4-diisocyanate (TDI) with xylylenediamine, and also triethylene glycol monobutyl ether and/or tetraethylene glycol monobutyl ether. In one or more embodiments, the thickener has a weight-average molecular weight of 1000 to 20 000 g/mol and an OH number and acid number of less than 50 mg KOH/g, more specifically of less than 10 mg KOH/g. Thickeners of this kind are available for example as Byk-410 (commercial product from the company Byk Chemie).

Besides the thickeners of the invention there may also be further thickeners present in the composition, and in this context, for example, it is also possible for the waxlike compounds described above to be suitable thickeners. However, all compounds in accordance with the definition of the thickeners of the invention are considered part of the fraction of the thickeners of the invention, and not part of other fractions, such as the waxlike compounds fraction, for example.

Suitable organic solvents are all organic solvents typically used in the paint industry, examples being alcohols, glycol ethers, esters, ether esters and ketones, aliphatic and/or aromatic hydrocarbons, such as, for example, acetone, methyl isobutyl ketone and methyl ethyl ketone, butyl acetate, 3-butoxy-2-propanol, ethyl ethoxypropionate, butyl glycol, butyl glycol acetate, butanol, dipropylene glycol methyl ether, butyl glycolate, xylene, toluene, Shellsol® T, Pine Oil 90/95, Solvent naphtha®, Shellsol® A, Solvesso, benzine 135/180 and the like.

The amount of organic solvents in the pigment paste (PP) of the invention is 30% to 80% by weight, specifically 40% to 70% by weight, based in each case on the overall composition of the pigment paste (PP).

Besides other solvents, it is preferred to use butyl acetate as a solvent, and it is present in the pigment paste (PP) specifically in an amount of at least 10% by weight, based on the overall composition of the pigment paste (PP).

In one or more embodiments, the pigment paste (PP) of the invention is free from water. This means that the pigment paste (PP) of the invention contains only such small amounts of water that the performance properties of the pigment paste (PP) of the invention are not affected as a result, and more particularly are not adversely affected. In one or more embodiments, the amount of water is below 5% by weight, based on the overall composition of the pigment paste (PP), more specifically below 1% by weight, and very specifically below the detection limit for water.

The pigment paste (PP) of the invention may further comprise customary and known adjuvants, such as customary paint additives. However, it is a particular advantage of the pigment paste (PP) of the invention that it need not contain any further adjuvants in order to achieve the advantages according to the invention.

The production of the pigment paste (PP) of the invention does not require any peculiarities in terms of method, but instead takes place in accordance with the customary and known methods for producing pigment pastes or pigment preparations, by mixing of the above-described constituents in suitable mixing assemblies such as stirred tanks, dissolvers, Ultraturrax devices, in-line dissolvers, agitated mills, bead mills or extruders. Here it is possible for the skilled person, on the basis of his or her general art knowledge, to select the processes and apparatus in such a way as not to damage the particular metal pigments (P) to be dispersed.

In accordance with the invention, the pigment paste (PP) of the invention is used for producing solventborne effect, or color and effect, coating materials (B), specifically solventborne basecoat materials (BL).

The resultant solventborne coating materials (B), more particularly the solventborne basecoat materials (BL), may be curable physically, thermally with self-crosslinking and/ or external crosslinking, with actinic radiation, or both thermally and with actinic radiation. Actinic radiation means near infrared (NIR), visible light or UV radiation, more particularly UV radiation. Joint thermal curing and curing with actinic radiation is also referred to by those in the art as dual cure.

In one or more embodiments, the solventborne basecoat materials (BL) are used for producing multicoat effect, or color and effect, paint systems on primed and unprimed substrates.

Substrates contemplated for the coating materials (B), more particularly for the basecoat materials (BL), include all surfaces for painting that are not damaged by curing of the coating systems on them using heat or using heat and actinic radiation. Suitable substrates consist, for example, of metals, plastics, wood, ceramic, fiber composites, glass, and assemblies of these materials. The surfaces of these materials may have already been painted or coated beforehand.

Solventborne coating materials (B), more particularly the solventborne basecoat materials (BL), are especially suitable, accordingly, for the painting of motor vehicle bodies and parts thereof, of the interior and exterior of motor vehicles, of the interior and exterior of buildings, for doors, windows and furniture, and also, in industrial coating, for the painting of plastics parts, more particularly transparent plastics parts, small parts, coils, containers, packaging, electrical components and white goods, and also for the coating of hollow glassware.

The solventborne coating materials (B), more particularly the solventborne basecoat materials (BL), are very suitable indeed for the original (OEM) finishing and refinishing of motor vehicles, more particularly of passenger cars.

In the case of electrically conductive substrates it is possible to use primers which are produced in a customary and known way from electrodeposition coating (electrocoat) materials. For these purposes both anodic and cathodic electrocoat materials are contemplated, but more particularly cathodic electrocoats.

With the coating of the invention it is also possible to paint primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations as per DIN 7728T1) and also polymer blends thereof, or the fiber-reinforced composite materials produced using these plastics.

In the case of unfunctionalized and/or nonpolar substrate surfaces, they may be provided prior to coating, in a known way, with a pretreatment, such as a plasma pretreatment or flame pretreatment, or with a hydroprimer.

The multicoat paint systems may be produced in a variety of ways. Preference is given to using the wet-on-wet techniques that are described in German patent application DE 199 30 664 A 1, page 15, lines 36 to 58, or in German patent application DE 199 14 896 A 1, column 2, line 15, to column 3, line 24, and column 16, line 54, to column 18, line 54.

On account of the outstanding distribution of the metallic pigments (P) in the pigment paste (PP) of the invention and the stability thereof on storage, the ultimate results are multicoat paint systems with outstanding shade stability and stability of the optical effects. The multicoat paint systems can therefore be used with advantage for the OEM finishing and refinishing of top-class passenger cars. In one or more embodiments, the coating materials (B) of the invention comprise between 0.25% and 30% by weight of the pigment paste (PP) of the invention, based on the overall composition of the coating material.

The solids content was determined by storing the sample (2 g) at 125° C. for 1 hour.

The amount which remains corresponds to the solids content of the weighed sample. If the solids content was determined in a different way, then time and temperature are reported accordingly, in brackets, for example.

The drop point is determined in accordance with DIN 51801 (Ubbelohde drop point determination; ASTM D-3954). The melting point can be determined by DSC in accordance with DIN 51007.

The acid number (AN) is determined in accordance with DIN 53402 and the OH number (hydroxyl number) in accordance with DIN 53240.

The number-average and weight-average molecular weights are determined by GPC analysis with THF (+0.1% acetic acid) as eluent (1 ml/min) on a styrene-divinylbenzene column combination. Calibration is carried out using polystyrene standards.

EXAMPLES

Preparation of a Wax Dispersion (W)

6.0 parts by weight of the polyethylene wax Luwax® EVA 1 granules from BASF AG (commercial polyethylene wax based on ethylene/vinyl acetate copolymers, having a melting point of 87-92° C., an Ubbelohde drop point of about 95° C. and a weight-average molecular weight of about 6500 g/mol) and 40.0 parts by weight of xylene are dissolved at 100° C. with slow stirring. With further stirring, the solution is cooled to 70° C., and 54.0 parts by weight of butyl acetate (technical, approximately 85%) are added slowly, with desired wax precipitation beginning. With further stirring, the dispersion is cooled further down to 35° C.

Preparation of a CAB Solution (C)

In a receiver, 76.0 parts by weight of butyl acetate are mixed with 24.0 parts by weight of CAB 381-2 BP (commercial cellulose acetobutyrate from Eastman) for 30 minutes.

Preparation of a Polyester (PE-1)

A mixture of 20.2 parts by weight of neopentyl glycol, 22.8 parts by weight of isophthalic acid, 10.0 parts by weight of adipic acid, 6.1 parts by weight of trimethylolpropane, 3.4 parts by weight of phthalic anhydride and 0.05 part by weight of dibutyltin oxide is introduced into a stirred tank fitted with a water separator, and this initial charge is heated to 200° C. with stirring under a nitrogen atmosphere. The water given off in the course of this heating is captured in the water separator. The reaction mixture is held at 200° C. until the acid number falls below a figure of 18 mg KOH/g. After cooling to 100° C., the solids content is adjusted to 60% by addition of xylene.

The resulting polyester resin (PE-1) has an acid number of 10 mg KOH/g and a hydroxyl number of 80 mg KOH/g, based in each case on the solids content. The weight-average molecular weight is 2700 g/mol.

Preparation of a Solventborne Mixing Varnish (ML)

The mixing varnish (ML) is prepared by mixing and homogenizing the following constituents:
30.0 parts by weight of the prepared wax dispersion (W),
10.0 parts by weight of the prepared CAB solution (C),
30.0 parts by weight of the prepared polyester binder (PE-1),
20.0 parts by weight of Maprenal MF650 (a butanol-etherified high-imino melamine resin; commercial product from Ineos Melamines GmbH),
0.5 part by weight of Byk-410 (a solventborne, urea-based thickener; commercial product from Byk Chemie),
2.0 parts by weight of n-butanol,
4.0 parts by weight of butyl glycol acetate and
3.5 parts by weight of butyl acetate.

Preparation of an Inventive Solventborne Aluminum Pigment Paste (PP-1)

The inventive solventborne aluminum pigment paste (PP-1) is prepared by mixing and homogenizing the following constituents:
25.0 parts by weight of butyl acetate,
25.0 parts by weight of Metallux 2192 (a nonleafing aluminum effect pigment paste of the silver dollar type, having an average particle size of 14 μm; commercial product from Eckart) and
50.0 parts by weight of the prepared solventborne mixing varnish (ML).

Preparation of an Inventive Solventborne Mica Pigment Paste (PP-2)

The inventive solventborne mica pigment paste (PP-2) is prepared by mixing and homogenizing the following constituents:
25.0 parts by weight of Iriodin 9225 SQB Rutil Perl-blau SW (a coated titanium dioxide mica effect pigment; commercial product from Merck KGaA) and
75.0 parts by weight of the prepared solventborne mixing varnish (ML).

Preparation of a Noninventive Solventborne Aluminum Pigment Paste (PP-3)

The noninventive solventborne aluminum pigment paste (PP-3) is prepared by mixing and homogenizing the following constituents:
75.0 parts by weight of butyl acetate,
25.0 parts by weight of Metallux 2192 (a nonleafing aluminum effect pigment paste of the silver dollar type, having an average particle size of 14 μm; commercial product from Eckart).

Preparation of a Noninventive Solventborne Mica Pigment Paste (PP-4)

The noninventive solventborne mica pigment paste (PP-4) is prepared by mixing and homogenizing the following constituents:
25.0 parts by weight of Iriodin 9225 SQB Rutil Perl-blau SW (a coated titanium dioxide mica effect pigment; commercial product from Merck KGaA) and
75.0 parts by weight of butyl acetate.

The pigment pastes (PP-1) and (PP-2) still had good processing properties after 6 months. Gentle reagitation produced a homogeneous mixture, and incorporation into paint was achieved without bits/agglomerates. The comparative experiments (PP-3) and (PP-4) exhibited severe settling after just a few days, were virtually impossible to reagitate, and produced bits in the resultant coatings.

Preparation of an Acrylate Binder (BM1)

In a reactor, 13.239 parts by weight of Solvesso 100 are introduced and heated to 167° C. The reactor is placed under a pressure of 0.35 bar (5 psi) and fed over a period of 4 hours simultaneously with a monomer mixture consisting of 2.149 parts by weight of acrylic acid, 10.765 parts by weight of hydroxyethyl acrylate, 11.484 parts by weight of 2-ethylhexyl acrylate, 11.484 parts by weight of butyl acrylate and 14.353 parts by weight of styrene and with an initiator mixture consisting of 0.719 part by weight of di-tert-butyl peroxide and 11.120 parts by weight of a solution of dicumyl peroxide in Solvesso 100 (50% strength). After 1 hour at the aforementioned temperature and the aforementioned pressure, the addition is made of 21.530 parts by weight of epsilon-caprolactone over a period of 1 hour. The reaction mixture is cooled to 150° C. and held for 1.5 hours under a pressure of 0.35 bar (5 psi). It is cooled and adjusted with Solvesso 100 to a solids content of 75% by weight. The resultant acrylate resin has an acid number of 23 mg KOH/g and an OH number of 73 mg KOH/g, based in each case on the solids content.

Preparation of a Resin Vehicle (TH1)

In a reactor, 5.762 parts by weight of xylene, 5.762 parts by weight of toluene, 0.179 part by weight of methanesulfonic acid are introduced and heated to 104° C. Then 80.615 parts by weight of 12-hydroxystearic acid are run into the reactor and the mixture is boiled under reflux at 171° C., with the water of reaction being removed. The reaction is ended when an acid number of 35 mg KOH/g is reached. After cooling, the solids content is adjusted with solvent naphtha to 80% by weight.

Preparation of Polymer Microparticles (M)

In a reactor, 43.16 parts by weight of solvent naphtha, 0.08 part by weight of N,N-dimethylcocosamine and 1.00 part by weight of ethyl acetate are introduced and heated to 104° C. The reactor is placed under a pressure of 0.69 bar (10 psi) and fed simultaneously over the course of 2 hours with a monomer mixture consisting of 27.63 parts by weight of methyl methacrylate, 3.85 parts by weight of 2-hydroxypropyl methacrylate, 0.83 part by weight of glycidyl methacrylate, 12.81 parts by weight of the prepared resin vehicle (TH1), 51 parts by weight of methacrylic acid and 1.52 parts by weight of octyl mercaptan and with an initiator mixture consisting of 2.28 parts by weight of tert-butyl peroxy-2-ethylhexanoate and 5.13 parts by weight of solvent naphtha. After 3 hours at the aforementioned temperature and the aforementioned pressure, the reaction mixture is cooled and adjusted with solvent naphtha to a solids content of 41% by weight. The resultant polymer microparticles have an acid number of 10 mg KOH/g and an OH number of 48 mg KOH/g, based in each case on the solids content.

Preparation of the Stabilized Inorganic Particles (N)

In a receiver vessel, 10.00 parts by weight of the prepared acrylate binder (BM1), 6.00 parts by weight of Degussa Aerosil® 380 (commercial hydrophilic fumed silica from Degussa AG, having a specific surface area (BET) of 380 m$^2$/g, an average primary particle size of 7 nm and an SiO2 content of >=99.8% by weight, based on the calcined substance), 41.7 parts by weight of solvent naphtha, 41.7 parts by weight of butyl acetate and 0.6 part by weight of a fatty acid ester as stabilizer were mixed and dispersed. The fatty acid ester used has a nonvolatile fraction of 96.2% by weight at 130° C. for 2 h, an OH number of 50 mg KOH/g and an acid number of 17.2 mg KOH/g, based in each case on the [130° C./2 h] solids content, containing 6-hydroxycaproic acid, hydroxyvaleric acid, lauric acid and polyethylene glycol (for example, the commercial wetting additive based on fatty acid esters, Solsperse® 39000 from Th. Goldschmidt).

Preparation of a Solventborne Basecoat Material (BL-1)

The solventborne basecoat material (BL-1) is prepared by mixing and homogenizing the following constituents:
10.0 parts by weight of the prepared wax dispersion (W),
22.0 parts by weight of the prepared polymer microparticles (M),
11.5 parts by weight of Resimene TM 755 (a monomeric hexamethoxymethyl/butylmelamine resin; commercial product from Ineos Melamines),
8.0 parts by weight of the prepared stabilized inorganic particles (N),
0.5 part by weight of Additol XL 480 (a wetting additive based on an amine resin-modified acrylic copolymer without silicone additions; commercial product from Cytec Surface Specialties),
0.8 part by weight of Tinuvin TM 384-2 (a UV absorber; commercial product from Ciba Specialty Chemicals, Inc.),
16.0 parts by weight of the prepared binder (BM1),
1.8 parts by weight of Nacure® 5225 (amine-blocked dodecylbenzenesulfonic acid, DDBSA catalyst; commercial product from King Industries, Inc.),
3.0 parts by weight of the prepared CAB solution (C),
15.0 parts by weight of the prepared inventive solventborne aluminum pigment paste (PP-1),
6.0 parts by weight of the prepared inventive solventborne mica pigment paste (PP-2), and
5.4 parts by weight of butyl acetate.

The solventborne basecoat (BL-1) is adjusted by further addition of 3.0 parts by weight of butyl acetate to a spray viscosity of 22 sec in the Ford 3 flow cup (23° C.). The solventborne basecoat material (BL-1) subsequently had a solids content of 41.0% by weight.

Preparation of a Solventborne Basecoat Material (BL-2)

The solventborne basecoat material (BL-2) is prepared by mixing and homogenizing the following constituents:
10.0 parts by weight of the prepared wax dispersion (W),
22.0 parts by weight of the prepared polymer microparticles (M),
11.5 parts by weight of Resimene TM 755 (a monomeric hexamethoxymethyl/butylmelamine resin; commercial product from Ineos Melamines),
8.0 parts by weight of the prepared stabilized inorganic particles (N),
0.5 part by weight of Additol XL 480 (a wetting additive based on an amine resin-modified acrylic copolymer without silicone additions; commercial product from Cytec Surface Specialties),
0.8 part by weight of Tinuvin TM 384-2 (a UV absorber; commercial product from Ciba Specialty Chemicals, Inc.),
16.0 parts by weight of the prepared binder (BM1),
1.8 parts by weight of Nacure® 5225 (amine-blocked dodecylbenzenesulfonic acid, DDBSA catalyst; commercial product from King Industries, Inc.),
3.0 parts by weight of the prepared CAB solution (C),
15.0 parts by weight of the prepared noninventive solventborne aluminum pigment paste (PP-3),
6.0 parts by weight of the prepared noninventive solventborne mica pigment paste (PP-4), and
5.4 parts by weight of butyl acetate.

The solventborne basecoat (BL-2) is adjusted by further addition of 3.0 parts by weight of butyl acetate to a spray viscosity of 22 sec in the Ford 3 flow cup (23° C.). The solventborne basecoat material (BL-2) subsequently had a solids content of 41.0% by weight.

Following preparation of the inventive solventborne pigment pastes (PP-1) and (PP-2) and non-inventive solventborne pigment pastes (PP-3) and (PP-4), they are stored at 25° C. for 5 days and then used for preparing the solventborne basecoat materials (BL-1) and (BL-2), respectively.

The preparation of two bitty films from the solventborne basecoat materials (BL-1) and (BL-2) by pneumatic application to a polyethylene film and drying of the coated film at 80° C. in a forced-air oven for 10 minutes exhibits significant formation of bits when using the solventborne basecoat material (BL-2). In contrast, the solventborne basecoat material (BL-1) does not produce any bits.

The reason for this is the agglomeration of the effect pigments in the noninventive solventborne pigment pastes (PP-3) and (PP-4), this agglomeration taking place after just brief storage. In the case of the inventive solventborne pigment pastes (PP-1) and (PP-2), there is no agglomeration of the effect particles after storage, and as a result, after incorporation of the inventive solventborne pigment pastes (PP-1) and (PP-2) into the solventborne basecoat material (BL-1), no bits are visible.

What is claimed is:

1. A solventborne pigment paste (PP) comprising effect pigments, wherein the solventborne pigment paste comprises, based in each case on the overall composition of the pigment paste (PP),
   (A) 10% to 30% by weight of at least one lamellar effect pigment (P),
   (B) 0.1% to 2.0% by weight of a waxlike compound (W),
   (C) 0.1% to 3.0% by weight of cellulose acetobutyrate (CAB),
   (D) 5.0% to 20% by weight of a polyester resin (PE),
   (E) 2.0% to 7% by weight of a melamine resin,
   (F) 0.1% to 0.5% by weight of a urea-based thickener, and
   (G) 30% to 80% by weight of organic solvents;
   wherein the solventborne pigment paste is effective as an additive in production and tinting of a coating system and (A), (B), (C), (D), (E), (F), and (G) add to 100%.

2. The solventborne pigment paste (PP) comprising effect pigments, according to claim 1, wherein the lamellar effect pigment is a mica pigment and/or metallic effect pigment.

3. The solventborne pigment paste (PP) comprising effect pigments, according to claim 1, comprising 15% to 25% by weight of the lamellar effect pigment (P).

4. The solventborne pigment paste (PP) comprising effect pigments, according to claim 1, comprising 0.5% to 1.5% by weight of the waxlike compound (W).

5. The solventborne pigment paste (PP) comprising effect pigments, according to claim 1, wherein the waxlike compound (W) is a polyolefin wax.

6. The solventborne pigment paste (PP) comprising effect pigments, according to claim 1, comprising 0.5% to 2.5% by weight of cellulose acetobutyrate (CAB).

7. The solventborne pigment paste (PP) comprising effect pigments, according to claim 1, comprising 5.0% to 15% by weight of the polyester resin (PE).

8. The solventborne pigment paste (PP) comprising effect pigments, according to claim 1, wherein the polyester resin has a weight-average molecular weight of 2000 to 20 000 g/mol, an acid number of 3 to 50 mg KOH/g and a hydroxyl number of 30 to 500 mg KOH/g.

9. The solventborne pigment paste (PP) comprising effect pigments, according to claim 1, comprising 4% to 7% by weight of the melamine resin.

10. The solventborne pigment paste (PP) comprising effect pigments, according to claim 1, wherein said melamine resin is a high-imino butanol-etherified melamine resin.

11. The solventborne pigment paste (PP) comprising effect pigments, according to claim 1, comprising 0.1% to 0.3% by weight of a urea-based thickener.

12. The solventborne pigment paste (PP) comprising effect pigments, according to claim 1, wherein the urea-based thickener is a polyurethane-modified urea.

13. The solventborne pigment paste (PP) comprising effect pigments, according to claim 1, comprising 40% to 70% by weight of solvent.

14. The solventborne pigment paste (PP) comprising effect pigments, according to claim 13, comprising at least 10% by weight, based on the overall composition of the pigment paste (PP), of butyl acetate in the solvent fraction.

15. A process for producing solventborne coating materials (B), the process comprising mixing the solventborne pigment paste (PP) of claim 1 with at least one coating constituent.

16. A solventborne coating material (B) comprising at least one solventborne pigment paste (PP) comprising lamellar effect pigments, according to claim 1.

17. The solventborne pigment paste (PP) comprising effect pigments according to claim 1, wherein upon storage at 25° C. for up to 3 months, the PP exhibits no settling and no coagulum being formed.

18. The solventborne pigment paste (PP) comprising effect pigments according to claim 1, wherein the solventborne pigment paste is effective to incorporate pigments into coating materials.

19. The solventborne pigment paste (PP) comprising effect pigments according to claim 1, wherein the lamellar effect pigment (P) is an aluminum pigment.

20. The solventborne pigment paste (PP) comprising effect pigments according to claim 1, wherein the effect pigment paste (PP) does not any comprise any pigment further to the lamellar effect pigment (P).

21. A solventborne pigment paste (PP) comprising effect pigments, wherein the solventborne pigment paste comprises, based in each case on the overall composition of the pigment paste (PP):
  (A) 10% to 30% by weight of at least one lamellar effect pigment (P);
  (B) 0.1% to 2.0% by weight of a waxlike compound (W);
  (C) 0.1% to 3.0% by weight of cellulose acetobutyrate (CAB);
  (D) 2.0% to 20% by weight of a polyester resin (PE) having a weight-average molecular weight of 2000 to 20,000 g/mol, an acid number of 3 to 50 mg KOH/g and a hydroxyl number of 30 to 500 mg KOH/g;
  (E) 4.0% to 7% by weight of a melamine resin;
  (F) 0.05% to 0.5% by weight of a urea-based thickener; and
  (G) 30% to 80% by weight of organic solvents;
  wherein the solventborne pigment paste is effective as an additive in production and tinting of a coating system.

22. The solventborne pigment paste (PP) comprising effect pigments according to claim 21, wherein the solventborne pigment paste is effective to incorporate pigments into coating materials.

23. The solventborne pigment paste (PP) comprising effect pigments according to claim 21, wherein (A), (B), (C), (D), (E), (F), and (G) add to 100%.

24. The solventborne pigment paste (PP) comprising effect pigments according to claim 23, wherein upon storage at 25° C. for up to 3 months, the PP exhibits no settling and no coagulum being formed.

25. The solventborne pigment paste (PP) comprising effect pigments according to claim 21, wherein the lamellar effect pigment (P) is an aluminum pigment.

26. The solventborne pigment paste (PP) comprising effect pigments according to claim 21, wherein the effect pigment paste (PP) does not any comprise any pigment further to the lamellar effect pigment (A).

* * * * *